April 16, 1968  T. F. GRIFFETH  3,378,694

VOLTAGE CHANGING POWER SUPPLY FOR ELECTRIC FENCES

Filed Feb. 4, 1966

Thurman F. Griffeth
INVENTOR.

BY *Clarence A. O'Brien*
*and Harvey B. Jackson*
Attorneys

United States Patent Office 3,378,694
Patented Apr. 16, 1968

3,378,694
VOLTAGE CHANGING POWER SUPPLY FOR ELECTRIC FENCES
Thurman F. Griffeth, % Cache Valley Enterprises, Inc., Preston, Idaho 83263
Filed Feb. 4, 1966, Ser. No. 525,255
8 Claims. (Cl. 307—132)

This invention relates to fences which are electrified so as to repel animals coming in contact therewith and more particularly to a power supply for such electrified fences through which a mild electrical shock is applied to repel such animals.

A primary object of the present invention is to provide in combination with an electrified fence, a power supply arrangement whereby a relatively high electrical potential is applied to the fence under normally dry weather conditions, the potential being substantially reduced, however, during precipitation so as to avoid unintentional shorting. Because of the voltage changing characteristics of the power supply arrangement a much higher potential may thereby be safely applied to the fence under dry conditions.

An additional object of the present invention in accordance with the foregoing object, is to provide an electrified fence supplied with electrical energy through a power transformer having at least two input winding sections with at least one of the input winding sections being connected to a constant source of voltage. The number of input winding sections connected across the constant source of voltage is accordingly increased in order to reduce the potential applied to the fence in response to moist soil conditions which will occur as a result of rain or other precipitation.

A further object of the present invention is to provide a moisture sensing circuit in combination with a power supply arrangement for electrified fences whereby relay operated facilities may be accurately adjusted for any particular soil conductivity property in order to effect a change in the potential applied to the fence when there is a predetermined change in the moisture content of the soil adjacent the surface thereof.

Figure 1:
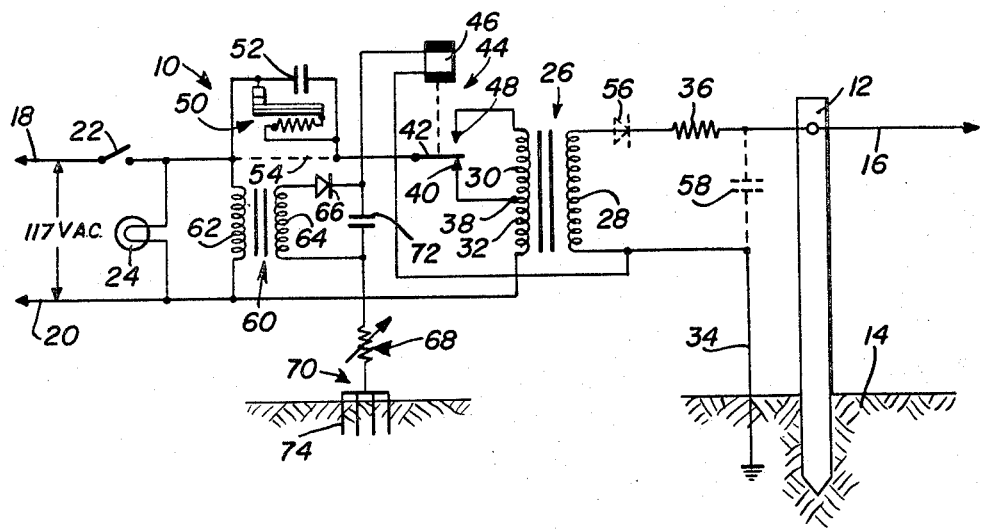
Figure 2:
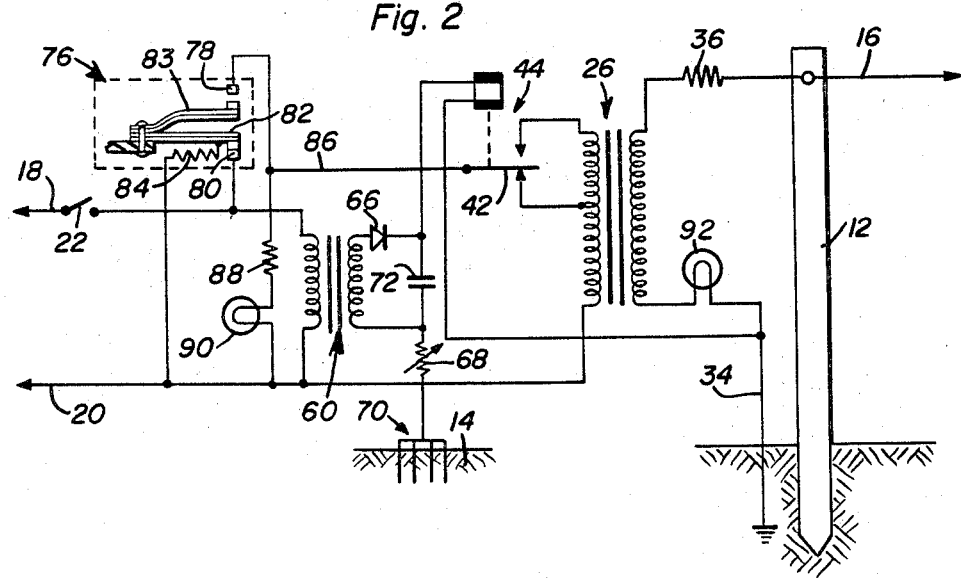

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an electrical circuit diagram showing one form of a power supply arrangement for an electrified fence in accordance with the present invention with modifications thereof shown by dotted lines; and FIGURE 2 is an electrical circuit diagram showing another power supply arrangement for electrified fences in accordance with the present invention.

Referring now to the drawings in detail and initially to FIGURE 1 it will be observed that the power supply arrangement generally denoted by reference numeral 10 is associated with an electrified fence as represented by a non-conductive post 12 anchored in the soil 14 supporting an electrically conductive element 16 to which an electrical potential is applied from the power supply arrangement 10. It will therefore be apparent that when an object such as an animal supported in contact with the soil 14 engages the electrically conductive element 16, a grounded path will be established through the objective so as to conduct current to the electrically conductive element 16 producing a shock where such object is an animal. It is of course essential that the potential applied to the electrically conductive element 16 be sufficiently high to accomplish this objective. However, maintenance of such potentials on the conductive elements of an electrified fence will often be dangerous during wet weather conditions causing a dangerously high flow of current in response to grounding as well as to cause unintentional shorting. The supply arrangement 10 is therefore automatically operative to substantially reduce the potential applied to the conductive element 16 when such wet weather conditions occur.

The commonly available constant source of voltage such as a 117 v. AC source is connected to the power supply through power lines 18 and 20 as shown in FIGURE 1 upon closing of the on-off switch 22. A pilot lamp 24 connected across the power lines will therefore indicate the availability of electrical energy from the voltage source. The power lines 18 and 20 are adapted to be connected to the primary circuit of a power transformer 26 having a secondary output winding 28 and at least two primary input winding sections 30 and 32. When the power lines 18 and 20 are connected across one of the input winding sections 32, there will be a step-up in voltage through the transformer inducing a relatively high voltage in the secondary winding section 28. One terminal of the secondary winding 28 is connected to deep ground by conductor 34 while the other terminal thereof is connected by a current limiting resistor 36 to the electrically conductive element 16 of the fence in order to apply a relatively high potential thereto. The limit resistor 36 prevents overload of the transformer 26 as well as to regulate the magnitude of the shock applied to an animal when it grounds the electrically conductive element. The voltage induced in the secondary winding 28 is, however, reduced whenever the power lines 18 and 20 are connected across both of the input winding sections 30 and 32 thereby changing the turn ratio of the transformer.

The input winding sections of the transformer 26 are separated by a tap 38 connected to the contact 40 normally engaged by the relay switch 42 associated with a voltage changing relay assembly 44 having a DC operated relay coil 46. It will therefore be apparent that upon energization of the relay coil 46, the relay switch 42 is displaced against the bias imposed thereon disengaging the contact 40 and engaging the contact 48. The contact 48 is connected to that end of the input winding of the transformer opposite the end to which the power line 20 is connected so that the power lines will be connected across both of the winding sections 30 and 32 in order to reduce the voltage induced in the secondary output winding 28.

In one form of the invention, the power line 18 is connected through relay switch 42 across either the single input winding section 32 or both winding sections 30 and 32 in series with a current interrupter device 50. The current interrupter is connected in parallel with a surge capacitor 52 for preventing the burning of the contact points therein. The interrupter is thus operative to intermittently interrupt the primary circuit of the transformer 26 and thereby intermittently energize the output winding 28. Accordingly, grounding of the conductive element 16 of the fence will produce an intermittent flow of current. This arrangement will be suitable for burning weeds that may unintentionally short the conductive element as well as to avoid any continuous flow of current from being conducted through an animal that may be grounding the conductive element.

As an alternative to the intermittent flow of grounding current between ground and the conductive element 16, the circuit illustrated in FIGURE 1 may be modified so as to supply a single shock pulse to any animal that may ground the conductive element 16. This is accomplished by removing the interrupter 50 from the circuit as indicated by the dotted line jumper conductor 54 directly connecting the power line 18 to the relay switch 42 and inserting a rectifier diode 56 between the secondary winding 28 and the current limiting resistor 36. Also, a storage capacitor 58 is connected between the conductive element 16 and the deep ground line 34. Accordingly, the transformer 26 will be continuously energized by the voltage source connected to the power lines 18 and 20. DC current conducted through the rectifier diode 56 and the limiting resistor 36 will maintain the charge on the capacitor 58 so that when the conductive element 16 is grounded by the first touch of an animal, the capacitor 58 will discharge in order to deliver a single shock pulse to the animal.

In the illustrated embodiment of the invention DC current is supplied to the relay coil 46 for energization thereof in order to change the voltage output of the power transformer 26 as aforementioned. Toward this end, a second transformer 60 is provided including a primary winding 62 connected across the power lines 18 and 20 and a secondary winding 64. One side of the secondary winding 64 is connected to a rectifier diode 66 for supply of DC current to the relay coil 46, the other side of the secondary winding being connected through an adjustable compensating resistor 68 to a moisture sensing feeler element 70. A filter capacitor 72 is connected across the secondary winding 64 in series with the rectifier diode 66 so that a proper DC energizing current may be conducted through the relay coil 46 for energization thereof. The rectifier diode is therefore connected to one terminal of the relay coil, the other terminal of which is connected to the deep ground line 34.

The feeler element 70 is embedded in shallow ground and may be made of a small, non-corrosive, metal plate to which a plurality of pins 74 are connected penetrating the soil to a proper depth. When the soil below the feeler element 70 is dry, a relatively high resistance ground path exists, the conduction of which is insufficient to permit flow of energizing current through the relay coil 46. The adjustable resistor 68 is connected in series with the feeler element 70 to the relay coil 46 so as to compensate for the different conductivity characteristics of soil within which the electrified fence may be installed. In addition to its sensitivity adjustment function, the resistor 68 also serves the function of limiting the flow of current through the relay coil from ground in order to prevent overload. It will therefore be apparent that when the moisture content of the soil reaches a certain value as a result of precipitation, current from ground will be conducted through the feeler element 70 and the adjustable resistor 68 for energization of the relay coil 46. The relay switch 42 will then be displaced into engagement with the contact 48 in order to cause energization of both input winding sections 30 and 32 thereby reducing the voltage induced in the secondary winding 28 of the power transformer 26. A reduction in the potential applied to the conductive element 16 is thereby effected.

Referring now to FIGURE 2, a power supply arrangement similar to the power supply 10 is illustrated including the transformer 60 connected to the power lines 18 and 20 upon closing of the on-off switch 22 forming a source of energizing current for the relay coil of the voltage changing relay assembly 44. Also, the circuit arrangement of FIGURE 2 includes the power transformer 26 with one side of the output winding thereof being connected through the limiting resistor 36 to the electrically conductive element 16 of the fence. A change in voltage is therefore also effected when the feeler element 70 detects a change in the conductivity of the soil 14. However, the relay switch 42 associated with the relay assembly 44 is connected to the power line 18 through an interrupter 76 having a normally disengaged contact 78 connected to the relay switch 42 and a normally engaged contact 80 connected to the power line 18 upon closing of the on-off switch 22. A thermally operated switch arm 82 engages the contact 80 so as to normally connect the heater element 84 across the power lines 18 and 20 for intermittent energization thereof. Energization of the heater element 84 will also displace the contact arm 83 into engagement with the contact 78 in order to maintain an electrical connection to the relay switch 42 as the circuit is intermittently interrupted by energization of the heater element 84. The interrupter 76 is thereby operative to intermittently energize the primary winding sections of the transformer 26.

The contact 78 in the interrupter is connected to the relay switch 42 by a conductor 86 so that the interrupter 76 will be operative to also intermittently connect the constant source of voltage across the series connected limiting resistor 88 and green indicator lamp 90. It will therefore be apparent that the lamp 90 will be flashed to signify operation of the interrupter 76 and intermittent energization of the transformer 26. A second red indicator lamp 92 is also connected between the deep ground line 34 and the output winding of the transformer 26 so as to signify by its illumination the grounding of the conductive element 16. Operation of the circuit shown in FIGURE 2 is otherwise similar to the operation described in connection with FIGURE 1.

From the foregoing description, the operation, arrangement and utility of the power supply for electrified fences will be apparent. The ability of the system to safely deliver repelling shocks to animals during both dry and wet weather not only provides more effective and complete control but also eliminates power loss due to fence post current leakage under wet weather conditions making operation of the system less costly. It should also be appreciated that the principles of the present invention may be applicable to other installational embodiments that require a voltage change in response to variations in the conductivity of any medium. Further, it will be appreciated that the circuit could also be adjusted so that the feeler element may detect changes in temperature that affect the conductivity of the medium being monitored.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. In combination with a fence or the like having an electrically conductive element adapted to be grounded by an object in contact with the soil, a voltage changing power supply connected to said conductive element comprising a power transformer having an output winding and at least two input winding sections, a current limiting resistor connecting said output winding to the conductive element, a constant voltage source, relay means connecting said transformer to the voltage source for energization of at least one of the input winding sections, and condition sensing circuit means connected to the relay means for increasing the number of input winding sections energized by the voltage source in response to changes in the conductivity of the soil to thereby reduce the potential applied to the conductive element.

2. The combination of claim 1 wherein said condition sensing circuit means includes a moisture sensing feeler element embedded in the soil adjacent the surface thereof, and compensating resistance means connecting the feeler element to the relay means for conducting energizing current from ground through the relay means under moist soil conditions.

3. The combination of claim 2 including storage capacitor means connected to the conductive element in shunt relation to the current limiting resistor for discharging through the conductive element in response to grounding thereof.

4. The combination of claim 1 including current interrupter means operatively connecting said voltage source to the transformer for intermittently conducting current through said conductive element in response to grounding thereof.

5. The combination of claim 4 including indicator means connected to the interrupter means and the output winding of the transformer for indicating energization of one of the input winding sections and the grounding of the conductive element respectively.

6. The combination of claim 5 wherein said condition sensing circuit means includes a moisture sensing feeler element embedded in the soil adjacent the surface thereof, and compensating resistance means connecting the feeler element to the relay means for conducting energizing current from ground through the relay means under moist soil conditions.

7. The combination of claim 1 including indicator means connected to the transformer for indicating energization of one of the input winding sections and grounding of the conductive element respectively.

8. The combination of claim 7 wherein said condition sensing circuit means includes a moisture sensing feeler element embedded in the soil adjacent the surface thereof, and compensating resistance means connecting the feeler element to the relay means for conducting energizing current from ground through the relay means under moist soil conditions.

References Cited
UNITED STATES PATENTS

| | | | |
|---|---|---|---|
| 2,196,046 | 4/1940 | Willis | 340—254 X |
| 2,422,012 | 6/1947 | Greenlee | 256—10 |
| 2,767,331 | 10/1956 | Hurst et al. | 307—132 |

JOHN F. COUCH, *Primary Examiner.*

WARREN E. RAY, *Examiner.*